United States Patent Office 2,882,253
Patented Apr. 14, 1959

2,882,253
METHOD FOR STABILIZING POLYVINYLPYRROLIDONE AND COMPOSITIONS THEREBY OBTAINED

Theodore B. Lefferdink and Teddy G. Traylor, Concord, Calif., assignors to The Dow Chemical Company, Midland, Mich., a corporation of Delaware No Drawing. Application November 16, 1955
Serial No. 547,293

13 Claims. (Cl. 260—29.6)

This invention relates to a method for improving the heat and light stability of polyvinylpyrrolidone and articles containing it and to compositions, including fiber compositions, thereby obtained.

Among other applications, polyvinylpyrrolidone is utilized as an adjuvant for hydrophobic synthetic textile fibers to improve their dye receptive properties. Thus, it is sometimes advantageously employed to increase the dyeability of synthetic fibers prepared from polymeric fiber forming materials which contain at least about 85 percent by weight of acrylonitrile in the polymer molecule. For convenience, such fibers are hereinafter referred to as acrylic fibers. Various known techniques may be employed for achieving an intimate association of the polyvinylpyrrolidone in acrylic and other hydrophobic synthetic textile fibers. Advantageously, for example, the fiber may be impregnated with the polyvinylpyrrolidone from a bath at an elevated temperature such as between about 70 and 100° C.

Unfortunately, however, polyvinylpyrrolidone tends to become discolored, usually to some shade of yellow, when it is exposed to light or subjected to heat at elevated temperatures. It is especially heat sensitive in aqueous solutions, particularly at relatively low concentrations, such as are frequently employed for fiber impregnation purposes. This, of course, is undesirable when polyvinylpyrrolidone is intended for employment as a dye assisting adjuvant for textile fibers. Whether its discoloration occurs before, during or after application to the fiber, there consequently results a product having an inferior appearance and poorer color characteristics. While certain known materials such as sodium hydrosulfite have some stabilizing influence on polyvinylpyrrolidone, their capacity to prevent heat and light discoloration of polyvinylpyrrolidone is limited to an insufficient degree and is not as great as would be desirable.

It would be advantageous for polyvinylpyrrolidone to be available in compositions which are effectively stabilized against discoloration from light and heat. Among other benefits, this would permit the preparation of hydrophobic synthetic fiber compositions which contained a polyvinylpyrrolidone adjuvant to enhance their dyeability without experiencing discoloration caused by exposure of the polyvinylpyrrolidone contained in the fiber to light and heat either before, during or after its incorporation in the fiber composition.

According to the present invention, these and other desirable results accrue when a minor proportion of zinc formaldehyde sulfoxylate is incorporated in polyvinylpyrrolidone to render it stable to the effects of light and heat. Generally, an amount of the sulfoxylate which is between about 0.1 and 5.0 percent by weight and advantageously is between about 0.1 and 1.0 percent by weight, based on the weight of the polyvinylpyrrolidone, may be incorporated to prepare effectively stabilized and non-discoloring compositions.

Ordinarily, hydrophobic synthetic textile fibers may advantageously be impregnated with an amount of polyvinylpyrrolidone for improved dye-receptivity which is not in excess of about 10 percent by weight, based on the weight of the fiber. Thus polyvinylpyrrolidone compositions containing between about 0.1 and 5.0 percent by weight of zinc formaldehyde sulfoxylate, based on the weight of the polyvinylpyrrolidone, are useful as impregnating baths for hydrophobic synthetic textile fibers, particularly when such compositions are prepared in the form of aqueous solutions. Synthetic fiber compositions containing as much as 10 percent by weight of a zinc formaldehyde sulfoxylate-containing polyvinylpyrrolidone have enhanced dye-receptive properties without being susceptible to discoloration by the presence of the polyvinylpyrrolidone adjuvant whenever the fiber compositions may be exposed to light or heat, or both, even for prolonged periods.

In some instances, however, polyvinylpyrrolidone-containing hydrophobic synthetic textile fiber compositions having greater stability may even more advantageously be prepared so as to contain the sulfoxylate in amounts between about 0.25 and 5.0 percent by weight, based on the weight of the fiber, along with the polyvinylpyrrolidone which is impregnated in the fiber to improve dye-receptivity. Even greater benefits may sometimes be obtained when such fiber compositions contain between about 1.0 and 2.5 percent by weight of the zinc formaldehyde sulfoxylate, based on the weight of the fiber. In synthetic fiber compositions containing about 10 percent by weight of the polyvinylpyrrolidone, for example, the more desirable amounts of zinc formaldehyde sulfoxylate which is contained in the composition is between about 2.5 and 50 and preferably between about 10 and 25 percent by weight, based on the weight of the polyvinylpyrrolidone in the composition. Such greater amounts of the sulfoxylate in polyvinylpyrrolidone-containing synthetic fiber compositions may be obtained by a separate impregnation of a polyvinylpyrrolidone-containing fiber with zinc formaldehyde sulfoxylate from a separate solution or the like or by increasing the contained proportion of the sulfoxylate in a polyvinylpyrrolidone impregnating bath for the fibers.

The zinc formaldehyde sulfoxylate employed in the practice of the present invention is a zinc salt of a substituted hyposulfurous acid having the empirical formula $Zn(SO_2CH_2OH)_2$. It is frequently employed as a reducing agent for vat dyes and is available as a material for such purposes under the trade-name "Sulfoxite S Conc." from the E. I. du Pont de Nemours & Co., Inc.

Preferably polyvinylpyrrolidone - containing acrylic fiber compositions are stabilized with the zinc formaldehyde sulfoxylate although similar polyvinylpyrrolidone-containing compositions with other hydrophobic synthetic textile fibers, including polyesters, polyamides and hydrocarbon polymers, may also be prepared with equally beneficial results. As mentioned, the fiber composition may advantageously be prepared by impregnating the desired fiber with the sulfoxylate stabilized polyvinylpyrrolidone from a bath at a temperature between about 70 and 100° C. until a desired polyvinylpyrrolidone adjuvant content, usually not in excess of about 10 percent by weight, is attained, although auxiliary sulfoxylate baths may also be employed. As is also apparent, polyvinylpyrrolidone and polyvinylpyrrolidone - containing compositions which are stabilized according to the present invention may advantageously be employed wherever it is desirable for them to be free from the discoloring influence of light and heat, provided no interference with an intended use is induced by the presence of the stabilizing sulfoxylate compound.

In order to further illustrate the invention but without being restricted thereto the following examples are given wherein, unless otherwise indicated, all parts and percentages are to be taken by weight.

*Example I*

A 10 percent aqueous solution of polyvinylpyrrolidone was prepared and separated into four equal portions. To three of the portions were separately added about 0.5 percent quantities, based on the weight of the polyvinylpyrrolidone, of sodium bisulfite, sodium hydrosulfite and zinc formaldehyde sulfoxylate respectively. The fourth portion was left as a control sample. The four portions were held at the boil at about 100° C. for about 48 hours. At intervals during this time, each portion was tested with a photoelectric instrument to determine its transmittance of light having an average wave length of about 430 millimicrons. The percentage of light transmission in such an analysis is inversely proportional to the relative degree of yellow discoloration occurring in the polyvinylpyrrolidone solution. The following table demonstrates the superior stabilizing properties of zinc formaldehyde sulfoxylate for polyvinylpyrrolidone.

| Stabilizer | Percent Transmittance | | |
|---|---|---|---|
| | at start | after 24 hrs. | after 48 hrs. |
| None | 96 | 83 | 35 |
| Sodium bisulfite | 90 | 64 | 38 |
| Sodium hydrosulfite | 92 | 70 | 62 |
| Zinc formaldehyde sulfoxylate | 95 | 95 | 89 |

*Example II*

When the procedure of Example I was repeated with a zinc formaldehyde sulfoxylate stabilized polyvinylpyrrolidone solution which contained only about 0.2 percent of the sulfoxylate, based on the weight of the polyvinylpyrrolidone, the percentage of transmittance of 430 millimicron light after 96 hours was 89 percent.

*Example III*

A 10 percent aqueous solution of polyvinylpyrrolidone was prepared and separated into two equal portions. About 0.25 percent of zinc formaldehyde sulfoxylate, based on the weight of the polyvinylpyrrolidone, was added to one of the portions. Both portions were heated at about 100° C. for about two hours, after which time they were visually examined and compared. The sulfoxylate-containing solution was noticeably and appreciably lighter in color than the plain polyvinylpyrrolidone solution which showed a distinct yellow discoloration.

*Example IV*

Polyacrylonitrile fibers were spun as a multiple filament, fine denier tow from an aqueous zinc chloride-containing spinning solution into an aqueous coagulating liquid according to a well known salt spinning technique. After coagulation and during an orientation treatment, the fibers, in an aquagel condition, were passed through an aqueous bath of polyvinylpyrrolidone which was maintained at about 100° C. and contained, at equilibrium conditions, about 3.8 percent of polyvinylpyrrolidone and about 0.019 percent of zinc formaldehyde sulfoxylate, based on the weight of the polyvinylpyrrolidone. About 10 grams of polyvinylpyrrolidone and about 0.025 gram of zinc formaldehyde sulfoxylate was continually replenished in the bath for about every 100 grams of fiber passed therethrough. The residence time of the fibers in the bath was about 15 seconds which was sufficient to impregnate them with about 10 percent of polyvinylpyrrolidone, based on the weight of the fiber, and about 0.25 percent of the sulfoxylate, based on the weight of the polyvinylpyrrolidone. A similar sample of polyacrylonitrile fiber was obtained which contained about 10 percent of impregnated polyvinylpyrrolidone but none of the sulfoxylate. While both of the fiber samples had excellent dye receptivity, the sulfoxylate-containing sample was found to have superior resistance to heat discoloration. After exposure of both samples to a temperature of about 150° C. for about 5 minutes, the sulfoxylate-containing sample was found to have a color which was represented by a reading of only 8.1 Judd units from white. The sample containing only the polyvinylpyrrolidone was significantly more discolored, having a reading which was 8.7 Judd units from white.

A similar relative improvement was noted in the impregnated fibers after prolonged spinning operations during which the impregnating baths were maintained at the elevated impregnating temperatures. The sulfoxylate-containing polyvinylpyrrolidone impregnating bath remained substantially colorless throughout an extended period of spinning and the color of the impregnated fibers was not affected substantially by the age of the sulfoxylate-containing bath with which it was impregnated.

In addition, the sulfoxylate-containing sample displayed much better resistance to discoloration induced by exposure to light. When both samples were exposed to a source of concentrated ultra-violet light in an Atlas Fadeometer, the sulfoxylate-containing sample did not display a detectable change in color until after about 120 hours of exposure. The sample which contained only polyvinylpyrrolidone changed color after only 80 hours of such exposure.

*Example V*

Polyacrylonitrile fibers similar to those obtained in Example IV were impregnated to contain about 10 percent of polyvinylpyrrolidone. Several samples of the fibers were then placed in various aqueous solutions of zinc formaldehyde sulfoxylate which were evaporated to dryness so that all of the sulfoxylate from the solutions would be impregnated in the fibers along with the polyvinylpyrrolidone. Both the amount of sulfoxylate employed in the solutions and the amount of the solutions employed were varied in order to obtain different impregnated amounts of the sulfoxylate in the various fiber samples. The samples were then subjected to heat at a temperature of about 150° C. for extended periods. Each sample was tested at intervals with a photoelectric instrument to determine its reflectance of light having an average wave length of about 420 millimicrons. A lower reflectance value is indicative of a greater degree of discoloration from white in the sample. The following table illustrates the beneficial influence of zinc formaldehyde sulfoxylate against the effects of discoloration due to heat in the polyvinylpyrrolidone-containing samples.

| Percent Sulfoxylate in Fiber, based on wt. of fiber. | Percent Reflectance after | | |
|---|---|---|---|
| | 5 min. | 30 min. | 300 min. |
| 0 | 60 | 38 | 15 |
| 0.5 | 66 | 48 | 23 |
| 2.0 | 69 | 51 | 27 |
| 5.0 | 66 | 46 | 21 |

*Example VI*

When polyester and polyamide fibers are impregnated with polyvinylpyrrolidone which is stabilized with zinc formaldehyde sulfoxylate, they have an improved dye-receptivity without being susceptible to becoming discolored upon exposure to heat and light due to the discoloration of the contained polyvinylpyrrolidone.

Since certain changes and modifications can readily be devised in the practice of the present invention, it is to be understood that all of the foregoing be interpreted as being merely illustrative of certain of its embodiments.

What is claimed is:

1. Method for stabilizing polyvinylpyrrolidone to light and heat which comprises incorporating between about 0.1 and 5.0 percent by weight of zinc formaldehyde sulfoxylate in the polyvinylpyrrolidone.

2. Method for stabilizing compositions containing polyvinylpyrrolidone to discoloration of the polyvinylpyrrolidone from light and heat which comprises incorporating between about 0.1 and 5.0 percent by weight of zinc formaldehyde sulfoxylate, based on the weight of the polyvinylpyrrolidone, in the composition.

3. The method of claim 2 wherein the composition is an aqueous solution of polyvinylpyrrolidone.

4. Method for stabilizing a hydrophobic synthetic textile fiber composition containing polyvinylpyrrolidone to discoloration of the polyvinylpyrrolidone from light and heat which comprises incorporating between about 0.25 and 5.0 percent by weight of zinc formaldehyde sulfoxylate, based on the weight of the fiber, in the composition.

5. A polyvinylpyrrolidone composition characterized in being stable to discoloration from light and heat which comprises polyvinylpyrrolidone and a minor proportion of zinc formaldehyde sulfoxylate.

6. A polyvinylpyrrolidone composition characterized in being stable to discoloration from light and heat which comprises polyvinylpyrrolidone and between about 0.1 and 5.0 percent by weight of zinc formaldehyde sulfoxylate.

7. A polyvinylpyrrolidone composition characterized in being stable to discoloration from light and heat which comprises polyvinylpyrrolidone and between about 0.1 and 1.0 percent by weight of zinc formaldehyde sulfoxylate.

8. A polyvinylpyrrolidone containing composition characterized in being stable to discoloration of the polyvinylpyrrolidone upon exposure of the composition to light and heat which comprises polyvinylpyrrolidone and between about 0.1 and 5.0 percent by weight of zinc formaldehyde sulfoxylate, based on the weight of the polyvinylpyrrolidone, in the composition.

9. An aqueous solution of polyvinylpyrrolidone containing between about 0.1 and 5.0 percent by weight of zinc formaldehyde sulfoxylate, based on the weight of the polyvinylpyrrolidone.

10. A hydrophobic synthetic textile fiber impregnated with polyvinylpyrrolidone containing a minor proportion of zinc formaldehyde sulfoxylate.

11. A fiber-forming acrylonitrile polymer fiber impregnated with polyvinylpyrrolidone containing between about 0.25 and 5.0 percent by weight of zinc formaldehyde sulfoxylate, based on the weight of the fiber, said acrylonitrile polymer containing in the polymer molecule at least about 85 weight percent of acrylonitrile.

12. A fiber-forming acrylonitrile polymer fiber impregnated with not more than about 10 percent by weight of polyvinylpyrrolidone containing between about 2.5 and 50 percent by weight of zinc formaldehyde sulfoxylate, based on the weight of the polyvinylpyrrolidone, said acrylonitrile polymer containing in the polymer molecule at least about 85 weight percent of acrylonitrile.

13. The fiber-forming acrylonitrile polymer fiber of claim 12 containing between about 10 and 25 percent by weight of the zinc formaldehyde sulfoxylate, based on the weight of the polyvinylpyrrolidone.

References Cited in the file of this patent

UNITED STATES PATENTS

| | | |
|---|---|---|
| 2,238,949 | Schlack | Apr. 22, 1941 |
| 2,495,918 | Bolton | Jan. 31, 1950 |
| 2,548,169 | Miller | Apr. 10, 1951 |
| 2,712,995 | Weyde | July 12, 1955 |

FOREIGN PATENTS

| | | |
|---|---|---|
| 822,084 | Germany | Nov. 22, 1951 |

OTHER REFERENCES

American Dyestuff Reporter, pp. 72–75, Feb. 1, 1954.